United States Patent [19]
Davoud et al.

[11] 3,858,395
[45] Jan. 7, 1975

[54] EXTERNAL COMBUSTION POWER PRODUCING METHOD AND APPARATUS

[75] Inventors: John Gordon Davoud; Jerry A. Burke, Jr., both of Richmond, Va.

[73] Assignee: D-Cycle Associates, Richmond, Va.

[22] Filed: Dec. 26, 1972

[21] Appl. No.: 318,433

Related U.S. Application Data

[63] Continuation-in-part of Ser. No. 226,206, Feb. 14, 1972, Pat. No. 3,798,908, which is a continuation of Ser. Nos. 58,099, July 24, 1970, abandoned, and Ser. No. 142,468, May 12, 1971, Pat. No. 3,716,990.

[52] U.S. Cl............... 60/688, 60/654, 60/689, 60/694
[51] Int. Cl. .............. F02g 1/06, F25b 27/00
[58] Field of Search ............ 60/645, 654, 651, 670, 60/671, 688, 689, 694, 697

[56] References Cited
UNITED STATES PATENTS

| | | | |
|---|---|---|---|
| 3,048,982 | 8/1962 | Geiger | 60/92 X |
| 3,358,451 | 12/1967 | Feldman et al. | 60/1 X |
| 3,686,867 | 8/1972 | Hull | 60/94 |
| 3,716,990 | 2/1973 | Davoud | 60/36 X |

FOREIGN PATENTS OR APPLICATIONS

| | | | |
|---|---|---|---|
| 36,456 | 8/1886 | Germany | 60/92 |

Primary Examiner—Martin P. Schwadron
Assistant Examiner—Allen M. Ostrager
Attorney, Agent, or Firm—Cameron, Kerkam, Sutton, Stowell & Stowell

[57] ABSTRACT

An external power producing method and apparatus are provided in which a mass of a condensable fluid is heated and preferably superheated to a vapor at a predetermined working temperature and pressure and a portion thereof is directed into a positive displacement engine or turbine-pressure recovery diffuser set, where it does non-expansive work. A portion of the superheated or heated vapor at working pressure and temperature is expanded in a work producing expansion device, after which the expanded fluid is condensed. The condensate or a weight equivalent thereof is directed into the superheated or heated condensable fluid in the positive displacement engine, or into the diffuser of the turbine-pressure recovery diffuser set. The mass of fluid from the positive displacement engine or turbine is then directed into the superheater or heater for the mass of fluid.

7 Claims, 3 Drawing Figures

EXTERNAL COMBUSTION POWER PRODUCING METHOD AND APPARATUS

This application is a continuation-in-part of our application Ser. No. 226,206 filed Feb. 14, 1972, now Pat. No. 3,798,908 which is a continuation of our application Ser. No. 58,099 filed July 24, 1970, now abandoned and related subject matter is disclosed in application Ser. No. 142,468 filed May 12, 1971 now Pat. No. 3,716,990.

In commonly owned application Ser. No. 226,206 filed Feb. 14, 1972, there is disclosed an external combustion power producing cycle wherein a condensable fluid is heated to the vapor state and the heated vapor is expanded isentropically. After expansion, the expanded fluid is separated into at least two portions without substantially changing the state of the expanded fluid such as temperature, pressure, entropy, enthalpy, or its specific volume. After the expanded fluid has been separated into portions, one of the portions is condensed, and the weight equivalent of the condensed portion is added, in liquid form, to the other portion of the expanded fluid. Thereafter, the mixture, now having substantially lower entropy than the fluid prior to addition of liquid, is compressed to the desired operating pressure.

In a variant of the power producing cycle, after the expanded fluid has been separated into portions, one of the portions is allowd to continue expansion, in such a way as to do further useful work, before being condensed as described above.

In commonly owned application Ser. No. 142,468 filed May 12, 1971, a variant power producing system is disclosed wherein steam or other condensable vapor heated to a predetermined temperatue at a predetermined pressure and having a given entropy is expanded in part in a work producing zone to a lower pressure and then condensed while the remaining part is expanded in a second zone; and following expansion, water is added thereto, with or without addition, or following withdrawal, of a portion of steam at the same state as the second portion of steam after expansion, to form a weight of steam greater than that introduced into the second zone but at a lower entropy, using the work of expansion in the second zone to compress the steam expanded in the second zone, plus the further portion of added steam, when such addition of steam is made, or minus the portion removed, when such removal is made, plus the added water, to the original predetermined pressure.

It has now been discovered that an improved method and apparatus for carrying out a closed or open external combustion power producing cycle comprises employing as one step a positive displacement engine such as a piston and cylinder unit, or a turbine-pressure recovery diffuser set. In, for example, a positive displacement engine such as a piston and cylinder unit, superheated or heated steam or other condensable vapor is directed into a cylinder with 100 percent cut-off so that the pressure of the fluid in, for example, the cylinder space at bottom dead center is the same or substantially the same as the pressure of the fluid leaving the superheater or heater. Thereafter, a portion of the superheated or heated fluid, either from the superheater or heater or from the positive displacement engine is expanded in a work producing expansion device and thereafter the expanded fluid is condensed and the condensate or a weight equivalent thereof is injected into the unexpanded fluid in the, for example, cylinder of the positive displacement engine. Injecting the liquid into the superheated or heated fluid at a substantial temperature difference between the liquid and the vapor, nearly 800°F. in the case of water and superheated steam, results in the attainment of a very rapid cooling and rapid reduction in volume of the superheated or heated fluid. After injection the fluid in the cylinder of the positive displacement engine is forced by the upward movement of the, for example, piston into the receiving end of the superheater or heater at or substantially at maximum operating pressure.

Operating under the principles of the present invention results in a highly efficient engine; the method is simple to carry out and the method is not materially affected by departures from ideal conditions, all as to be more fully described hereinafter with specific referecne to the accompanying drawing wherein.

The invention may be generally defined as an external combustion, power producing method comprising:

a. heating a mass of condensable fluid to a gaseous working temperature and pressure;

b. directing a portion of the gaseous condensable fluid into a positive displacement engine or a turbine-pressure recovery diffuser set without net drop in pressure of the gaseous fluid;

c. expanding a portion of the mass of the gaseous condensable fluid in an expansion device;

d. condensing the expanded portion of the gaseous condensable fluid;

e. adding the condensate or its weight equivalent from step (d) to the heated gaseous condensable fluid in the positive displacement engine or the diffuser of the turbine-pressure recovery diffuser set to thereby reduce the volume of the gaseous fluid contained therein; and g. thereafter directing the mass of gaseous fluid of reduced volume into the heater for reheating to the working temperature.

Figure 1:
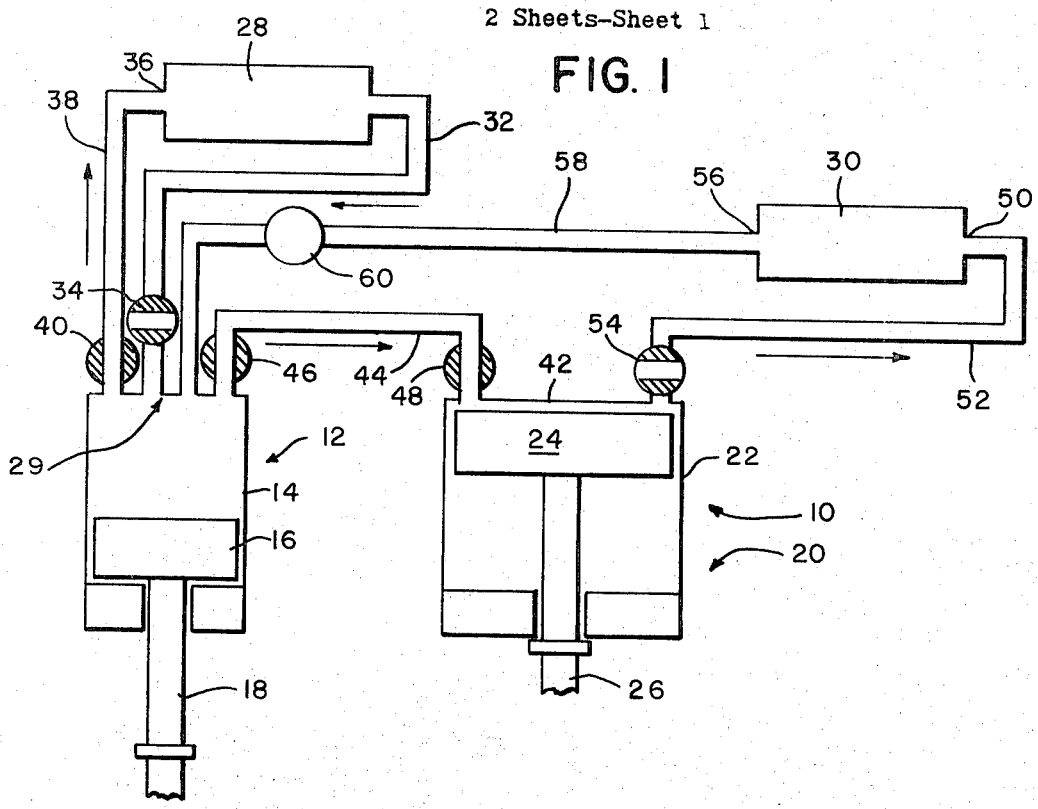
FIG. 1 is a schematic diagram illustrating apparatus adapted to carry out a specific embodiment of the present invention.

The invention will be more particularly described in reference to FIG. 1 of the drawing wherein 10 generally designates a closed cycle external combustion power producing system including a non-expansive engine illustrated as a piston and cylinder unit 12 composed of a cylinder 14, and a reciprocating piston 16 having a piston rod 18 attached thereto. While the non-expansive engine is illustrated as a reciprocating piston and cylinder unit, a rotary engine or, for example, a turbine-pressure recovery diffuser could be substituted therefor.

The system also includes an expansive engine generally designated 20 which in the illustrated form of the invention comprises a cylinder 22 having a piston 24 reciprocatively mounted therein which piston has a piston rod 26 connected thereto. The unit also includes a heater or superheater 28 and a condenser 30. The superheater 28 is connected to the upper cylinder chamber 29 of non-expansive engine 12 via a conduit 32 having a control valve 34 in the line. The control valve 34 is mechanically connected to means associated with the piston rod 18 for cyclic actuation as to be more fully described hereinafter. The upper cylinder space 29 of the non-expansive engine 12 is connected to the input end 36 of the heater or superheater 28 via a conduit 38 having a valve 40 mounted in the line, which valve 40 is also mechanically connected to means associated with the piston rod 18 for cyclic operation.

The expansive engine 20 has its upper cylinder space 42 connected to the upper cylinder space of non-expansive engine 12 via a conduit 44. The conduit 44 is provided with a pair of control valves 46 and 48. The use of the pair of valves at the shown positions is to reduce dead space in cylinders 12 and 20. Control valve 46 is mechanically linked to means associated with the piston rod 18 while valve 48 is mechanically connected to means associated with the output piston rod 26 of expansive engine 20. The upper cylinder chamber 42 is connected to the input end 50 of condenser 30 via conduit 52 which conduit is provided with a control valve 54 mechanically linked to means associated with the output piston rod 26 of engine 20.

The output end 56 of condenser 30 is connected to the upper cylinder space 29 of engine 12 via conduit 58 and a variable delivery metering pump 60 having its high pressure outlet downstream of the condenser 30.

Figure 2:
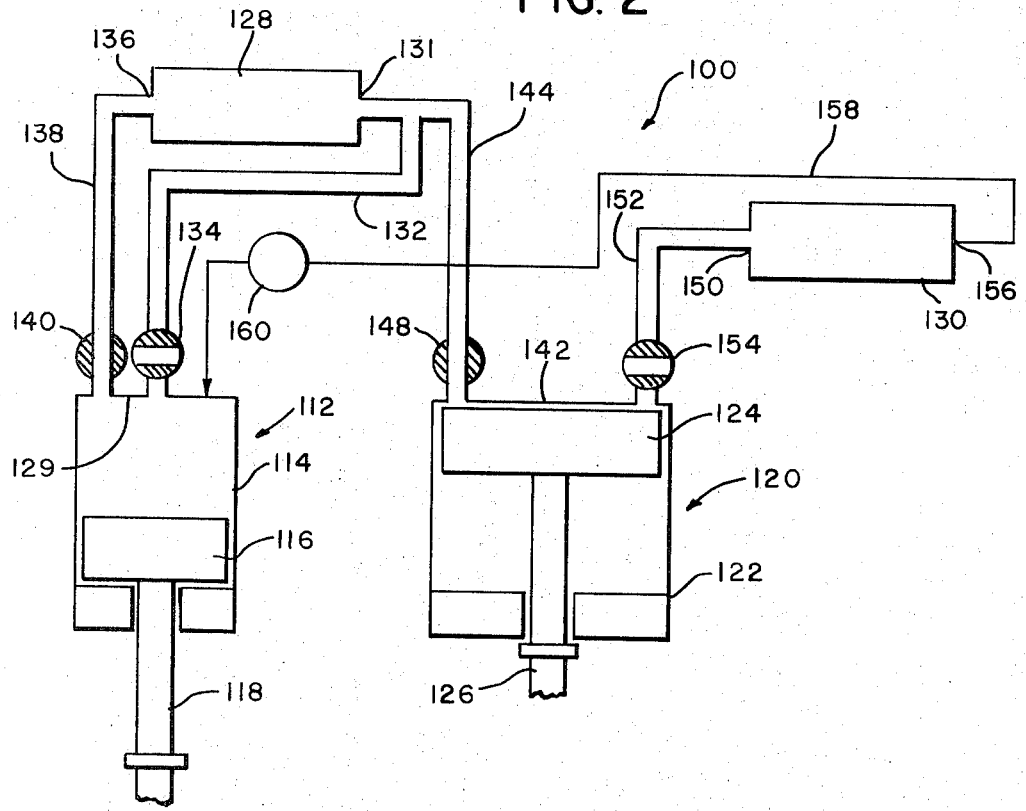
FIG. 2 is a schematic diagram illustrating another specific embodiment of the present invention.

The invention may also be carried out in apparatus such as illustrated at 100, FIG. 2 of the drawing. IN FIG. 2, 112 generally designates a non-expansive reciprocating engine including a cylinder 114 having a piston 116 slidably mounted therein. The piston 116 has secured thereto a piston rod 118. The system also includes an expansive engine generally designated 120 and which includes a cylinder 122 having a piston 124 slidably mounted therein which piston has secured thereto a piston rod 126. A heater or superheater 128 and a condenser 130 completes the primary elements of the system.

The upper cylinder space 129 of engine 112 is connected to the output end 131 of heater 128 via a conduit 132 having a valve 134 mounted therein. The valve 134 is mechanically linked to means associated with the piston rod 118. The upper cylinder space 129 is also connected to the inlet end 136 of the heater or superheater 128 via a conduit 138 which conduit has inserted therein a valve 140 mechanically linked to means associated with the output piston 118.

The upper cylinder space 142 of the expansive engine 120 is also connected to the output end 131 of the heater or superheater 128 via conduit 144 which conduit has inserted therein a flow control valve 148 mechanically linked to means associated with the output piston rod 126.

The upper cylinder space 142 of the expansive engine 120 is also connected to the input end 150 of the condenser 130 via a conduit 152 having inserted therein a valve 154 mechanically linked to means associated with the output piston rod 126 of engine 120. The outlet end 156 of the condenser 130 is connected to the upper cylinder space 129 of engine 112 via a line 158 and a variable delivery fluid pump 160 whose high pressure output end is downstream of the condenser 130.

In the methods for positive displacement piston engines, relating to FIGS. 1 and 2, steam or vapor leaving the non-expansive cylinder has a substantially lower volume than the steam admitted to the cylinder; while the pressure remains substantially the same.

A method of attaining the same state points at the inlet and outlet ends of the heater or superheater, in conjunction with rotating equipment of the turbine type, can be achieved by the use of a turbine plus a pressure recovery diffuser, hereinafter referred to as a turbine-pressure recovery diffuser set. Such a device, which makes use of known types of equipment, is shown schematically in FIG. 3.

Figure 3:
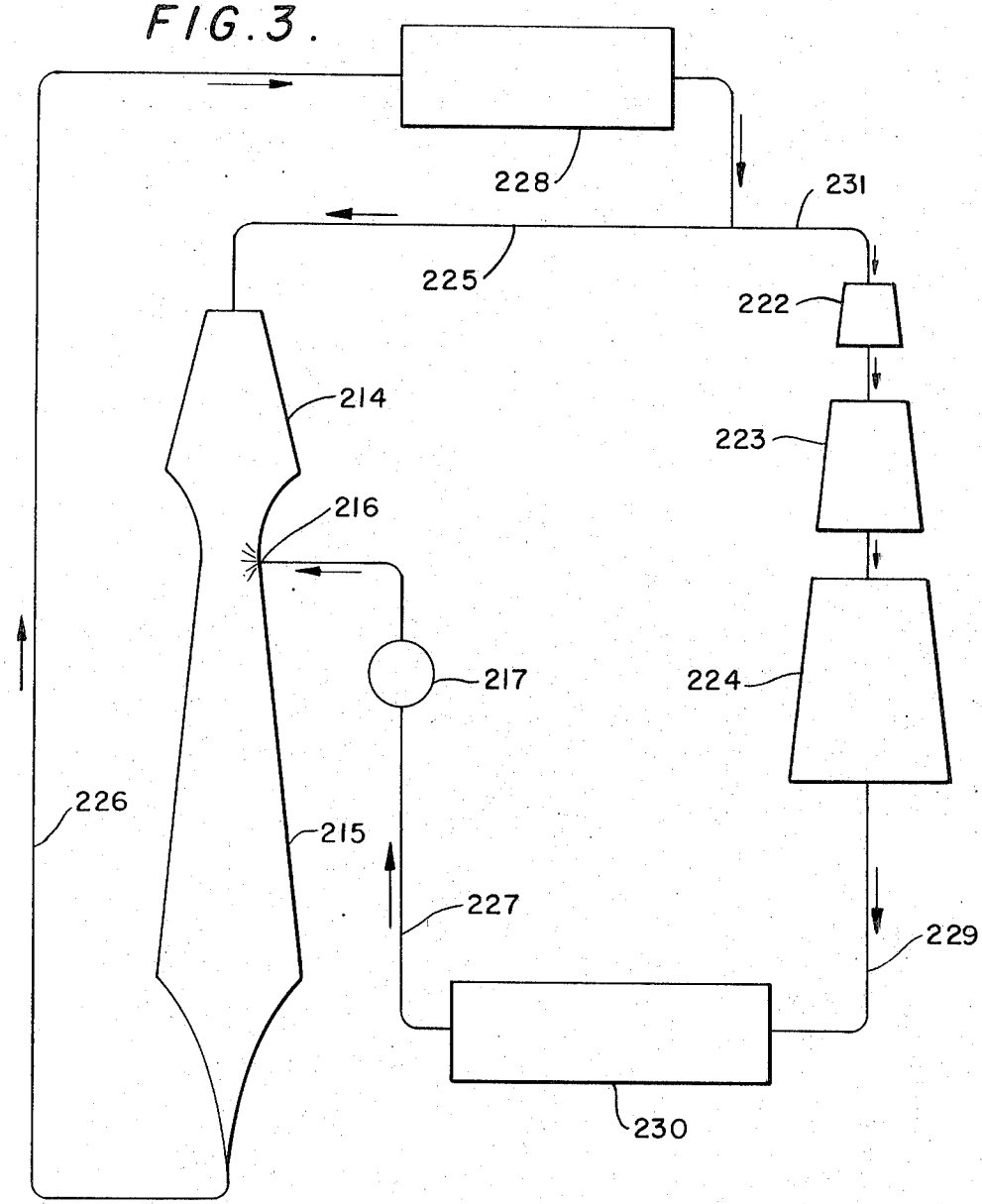
FIG. 3 is a schematic diagram illustrating a specific embodiment of the present invention appled to dynamic rotating expanders.

In FIG. 3, 214 generally designates a high-pressure turbine operating over a relatively small pressure range. The turbine is connected to a pressure recovery diffuser 215; means for injecting liquid into the diffuser inlet at 216 by means of injection pump 217, connected via conduit 227 to condenser 230, is provided.

Turbine 214 is connected to the outlet of heater or superheater 228 via conduit 225. Diffuser 215 is connected via conduit 226 to low temperature end of heater or super-heater 228.

Superheater 228 also leads via conduit 231 to a turbine or multi-stage low, intermediate and high pressure turbine set as common in the industry, designated 222, 223 and 224. The exhaust of the low pressure turbine 224 is connected via conduit 229 to condenser 230. Condensate from the condenser is injected at point 216 into diffuser 215 as hereinbefore described.

In practice, a portion of steam from heater or superheater 228 is passed via conduit 231 to turbines 222, 223, 224 and exhausted to condenser 230 in the manner practiced in, for example, the electrical generating industry.

A further portion of the steam from heater or superheater 228 is passed to high pressure turbine 214. Into steam exhausting from 214, is injected all condensate from steam passed through turbine set 222, 223, 224. The steam from turbine 214, now with temperature and volume reduced by injection of water at 216, passes into pressure recovery diffuser 215, where the velocity is reduced, while the pressure is increased to the operating pressure at the heater or superheater inlet.

The allowable pressure drop through turbine 214, the proportion of steam diverted to the normal expansion turbine set 222, 223, 224, the proportions and angle of divergence of diffuser 215, are determined by the velocity requirements of the exhaust steam from turbine 214. This must be sufficient to restore the pressure of steam passing into heater 228 to the maximum operating pressure of the systems, i.e., the pressure at the heater or superheater inlet.

Methods of operating the structures illustrated in FIGS. 1 and 2 will be more fully described in reference to the following examples.

EXAMPLE I

In cylinder 14 admit 1 lb. steam via conduit 32 at maximum working pressure and temperature for full stroke, i.e., 100 percent cut-off. Remove a portion of steam $a$ from cylinder 14; transfer to cylinder 22 via conduit 44 and valves 46 and 48 and allow to expand isentropically to some lower temperature and pressure. Condense all steam ($a$ lbs) from cylinder 22, add back water at condensing temperature ($a$ lbs) to steam ($1-a$) lbs still at maximum temperature and pressure in cylinder 14.

$a$ can be such, for example, that it will cool ($1-a$) lbs of superheated steam to the saturated vapor line, thereby reducing the specific volume. Steam in cylinder 14, still at full operating pressure, but cooled to saturated vapor line, is then expelled from cylinder 14 into the superheater 28.

EXAMPLE II

Add 1 lb of steam at 1,000 psia and 1,000°F. to cylinder 14; admit for full stroke, i.e., no expansive working.

$\bar{v}$ at 1,000 psia and 1,000°F = 0.8305 cubic feet/lb.

$h$ at 1,000 pisa and 1,000°F = 1505.9 BTU/lb.

Work done on admission is 0.8305 × 1000 × 144/778 BTU

At bottom of stroke, remove $a$ lbs. $a$ is such that when added as water to (1−$a$) lbs at 1,000 psia and 1,000°F it will remove all superheat. Added water is at saturation temperature for a lower pressure such as, for example, 20 psia.

$h$ (water at 20 psia) = 196.26 BTU/lb
$h$ (steam at 1,000 psia & 1,000°F) = 1505.9 BTU/lb
$h$ (saturated steam at 1,000 psia) = 1192.4 BTU/lb
$\bar{v}$ (saturated steam at 1,000 psia) = 0.4459 cubic ft/lb Then:
$a \times 196.26 + (1−a)\ 1505.9 = 1192.4$
$a\ (1309.6) = 313.5$
$a = 0.239$ Then allow $a$ = 0.239 lbs of steam at 1,000 psia and 1,000°F to expand isentropically to 20 psia.

Work Out (Non-Expansive)
= (Work done during admission − Work required to remove steam)
= 1000 × 144/778 × (0.8305 − 0.4459) = 71.3 BTU Now: Remove 0.239 lb from cylinder 14 to cylinder 22; allow to expand isentropically in cylinder 22 to 20 psia ($\approx$ = 20.09).

volume in expansive cylinder at end of expansion is 0.239 × 20.09 = 4.80 c.f.

Ratio of cylinder diameter 22/14 = $\sqrt{4.80/.8305}$ = $\sqrt{5.78}$ = 2.405:1

Ratio of cylinder volume 22/14 = 5.78

If the stroke of each cylinder is the same, when the piston in expansion cylinder 22 goes down, and shile piston in non-expansive cylinder 14 is going up, steam admitted to 22 will throttle at constant enthalpy from $\bar{v}$ of 0.8305 to 5.78 × 0.8305 = 4.81 cubic feet.

This amount to throttling to $\approx$ −175 psia at 970°F ($\bar{v}$ = 4.81; $s$ = 1.8478).

Work done in 22 by admission of this steam balances work done in removing it from 14.

This steam then expands to 20 psia from 175.

W.O./lb (expansive) = 1506 − 1248 = 258 BTU/lb
Net expansive W.O. effective = 0.239 × 258 = 61.6 BTU
Total W.O. = 71.3 + 61.6 = 132.9

Heat in = B.T.U. required to raise 1 lb. of steam at 1,000 psia from saturation to 1,000°F = 1505.9 − 1192.4 = 313.5 B.T.U./lb.

Efficiency $a$ − 132.9/313.5 = 42.4; %

EXAMPLE III

Conditions as for Example II. Expansive steam in cylinder 122 is admitted straight from superheater 128; and after condensing is added to all the steam in cylinder 114.

Add 1 lb of steam at 1,000 psia and 1,000°F to cylinder 112. Admit for full stroke.

In cylinder 14 add $b$ lbs of steam at 1,000 psia and 1,000°F. Expand isentropically to 40 psia. Condense all steam ($b$ lbs) from cylinder 122.

Inject all condensate from 122 ($b$ lbs) into cylinder 114 at bottom of stroke.

$b$ is such that it will cool superheated steam in 114 to saturated vapor line, and reduce specific volume.

As in Example II $h$ (saturated water at 20 psia) = 196.26 BTU/lb
$h$ (steam at 1,000 psia and 1,000°F) = 1505.9 BTU/16 lb
$h$ (saturated steam at 1,000 psia) = 1192.4

$b \times 196.26 + 1\ (1505.9) = 1192.4\ (1 + b)\ 996.1\ b = 313.5$ $b = 0.314$

Then:
Work out (non-expansive)
=(Work on admission of 1 lb os steam at 1,000 psia and 1,000°F)
−(Work of removing 1.314 lbs of saturated steam at 1,000 psia)

Total work is
Non-expansive 1000 × 144/778 (0.8305 − 1.314 × 0.4459) × 45.3 BTU
Expansive 0.314 (1505.9 − 1104) = 126 BTU Efficiency $e$ = 126 + 45.3/1.314 × 313.5 = 171.3/1.314 × 313.5 = 41.5 percent.

From the foregoing Examples and the foregoing description of the apparatus shown in FIGS. 1 and 2, it will be seen that the method of the invention results in a highly efficient engine; however, various modifications may be made in the method without materially affecting the efficiency of the method. For example, it is not essential that the pressure in cylinders 14 and 114 stay constant throughout the cycle although in the ideal cases as set forth in the Examples it would do so. It is, of course, essential that on the upstroke of the pistons 16 and 116, the pressure within the cylinders is at least as great as the pressure in the high pressure ends of the superheaters 28 and 128 prior to the opening of the valves 40 and 140, otherwise it would be impossible for the gaseous condensable fluid to flow into the superheaters.

In respect to the injection of the condensed liquid into the cylinders 14 and 114 injection may be such that the rate of liquid addition with respect to the stroke of the pistons 16 and 116 is such that the pressure within the cylinders 14 and 114 remain constant.

It will also be appreciated that the liquid admitted to cylinders 14 and 114 need not be such that the gaseous condensable fluid in the cylinders is cooled to the saturated vapor line. The cycle will function if only enough liquid is added to partially remove the superheat from the gaseous fluid. The system will aslo function if liquid is added to remove all of the superheat and further condense some of the saturated vapor. The effect on the efficiency and therefore total power of the system where the gaseous fluid in cylinders 14 and 114 is not cooled just to the saturated vapor line is as follows.

Removal of only part of the superheat increases the efficiency while the total work done by the system per pound of working fluid is decreased whereas if all of the superheat is removed and a further reduction in volume is brought about by condensation of some of the saturated steam, efficiency will be decreased while the total work done by the system would be increased.

It will also be appreciated that where the system is used, for example, in atomic energy power generating systems, the entire cycle would be carried out at lower temperatures below superheat, between limits such as, for example 530°F. to about 100°F.

We claim:

1. An external combustion power producing method comprising:
   a. heating a mass of condensable fluid to a gaseous working temperature and pressure;
   b. directing a portion of the gaseous condensable fluid into a positive displacement engine or through a turbine-pressure recovery diffuser set so arranged as to effect recovery of pressure to the operating inlet pressure of the heat input unit;
   c. expanding a portion of the mass of the gaseous heated condensable fluid in an expansion device;
   d. condensing the expanded portion of the gaseous condensable fluid;
   e. adding the condensate or its weight equivalent from step (d) to the heated gaseous condensable fluid in the positive displacement engine, to thereby reduce the volume of the gaseous fluid contained therein; or into the diffuser of the turbine pressure-recovery diffuser set, the angle of divergence of the diffuser being such as to bring the pressure of the exit stream from the diffuser to the operating inlet pressure of the heat input unit;
   f. thereafter directing the mass of gaseous fluid of reduced volume into the heater for reheating to the working temperature.

2. The method defined in claim 1 wherein the state point of the working fluid at maximum temperature and pressure is in the superheat.

3. The invention defined in claim 1 wherein the state point of the working fluid at maximum temperature and pressure is in the superheat and the amount of liquid added in step (e) reduces the temperature to the saturated vapor line.

4. The invention defined in claim 1 wherein the state point of the working fluid at maximum temperature and pressure lies in the region of superheat, and the amount of liquid added in step (e) removes all superheat, and further condenses a portion of steam, resulting in wet steam at maximum working pressure after addition of water.

5. The invention defined in claim 1 wherein the state point of the working fluid at maximum temperatures and pressure lies on the saturated vapor line or within the vapor dome.

6. An external combustion power producing apparatus comprising:
   a. means for heating a mass of condensable fluid to a gaseous working temperature and pressure;
   b. means directing a portion of the gaseous condensable fluid into a positive displacement engine without expansion of the gaseous fluid;
   c. an expansion device for a portion of the mass of the gaseous heated condensable fluid;
   d. means for adding the condensate of the expanded portion of the fluid or its weight equivalent to the heated gaseous condensable fluid in the positive displacement engine to thereby reduce the volume of the gaseous fluid contained therein; and
   e. means for directing the mass of gaseous fluid of reduced volume into the heater means of (a) for reheating to the working temperature.

7. The apparatus defined in claim 6 wherein the heater means comprises a superheater.

* * * * *